Oct. 28, 1930.  W. W. HARRITT  1,779,810
METHOD AND PLANT FOR DRYING SEWAGE SLUDGE
Filed Nov. 14, 1927  3 Sheets-Sheet 3
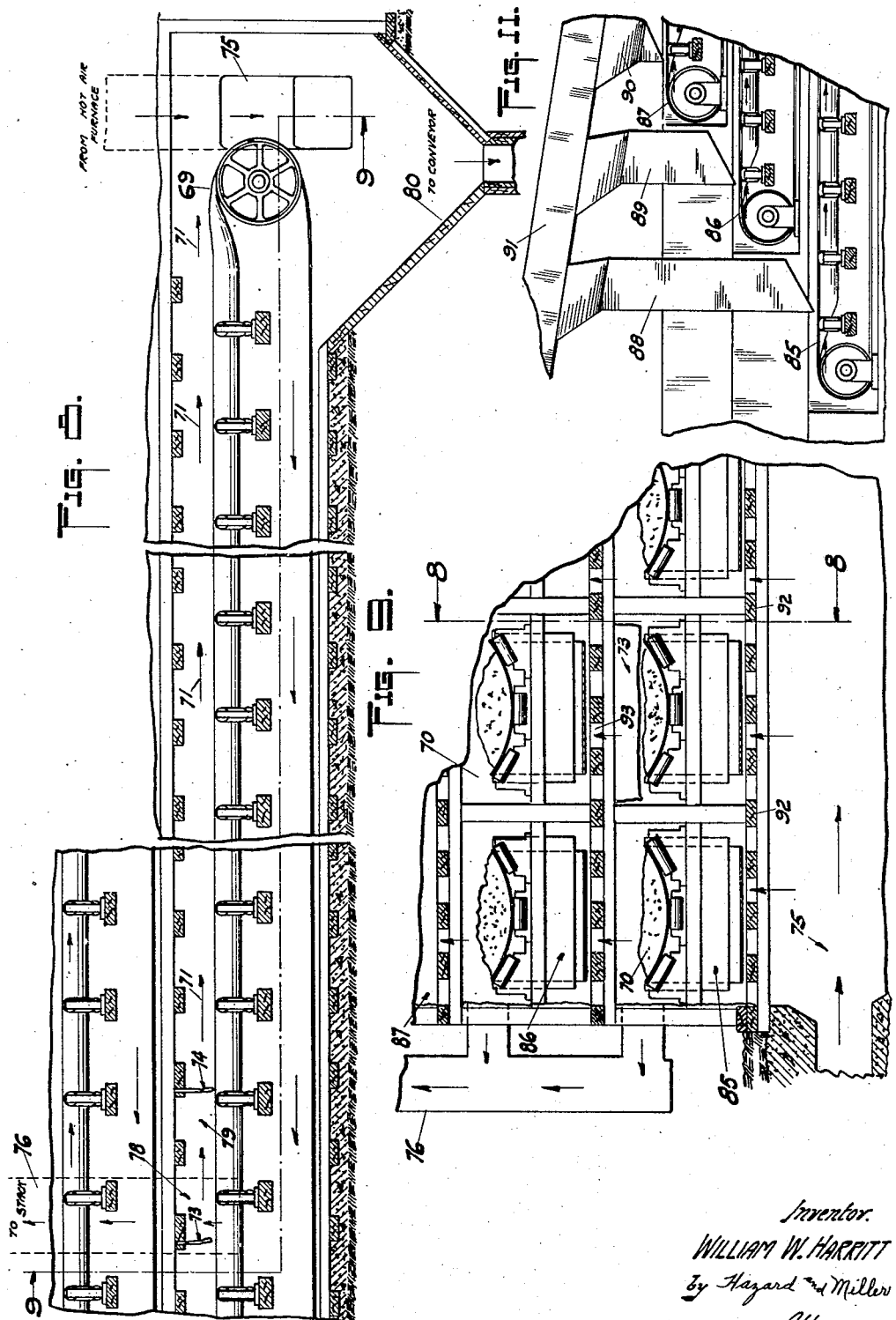

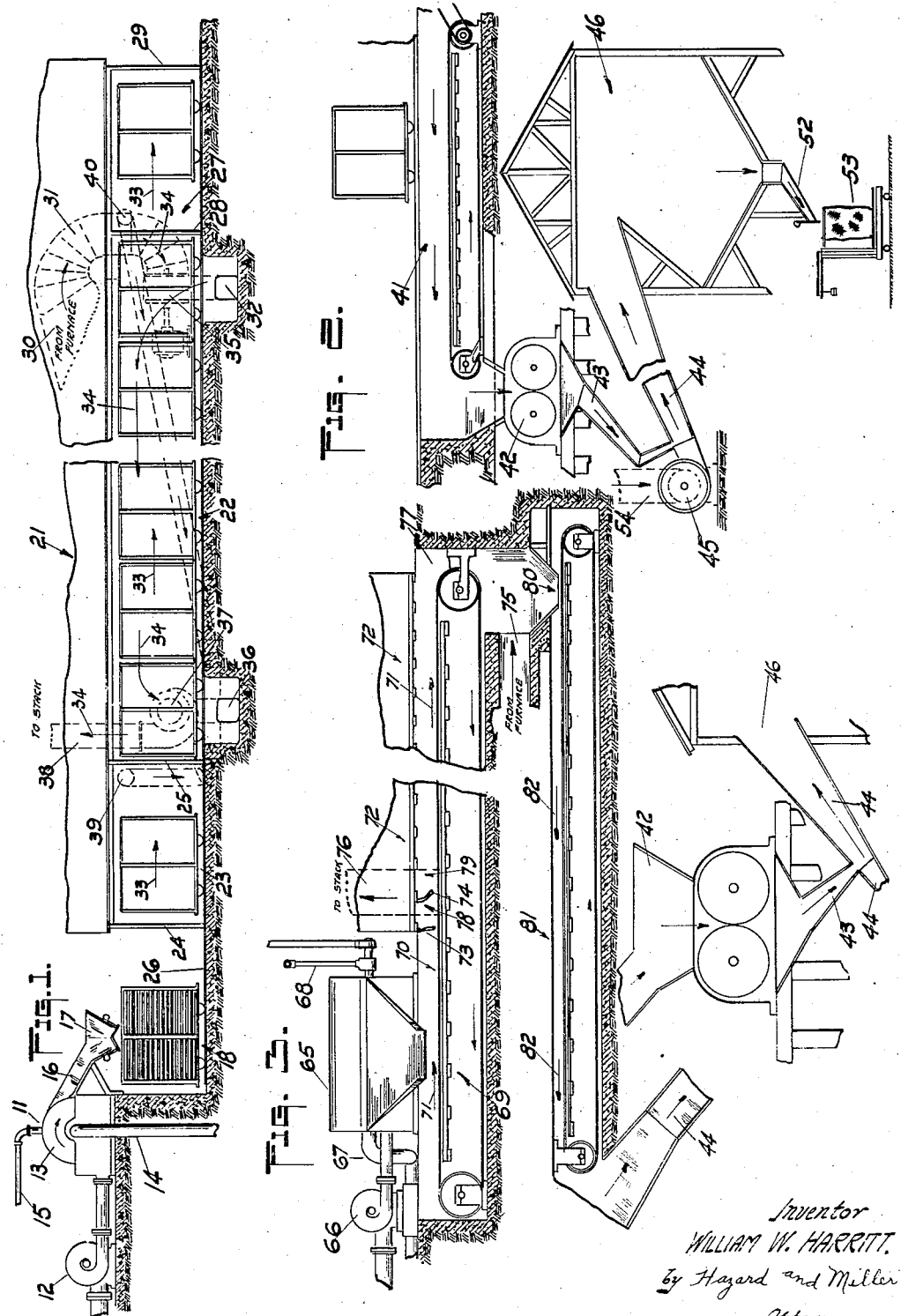

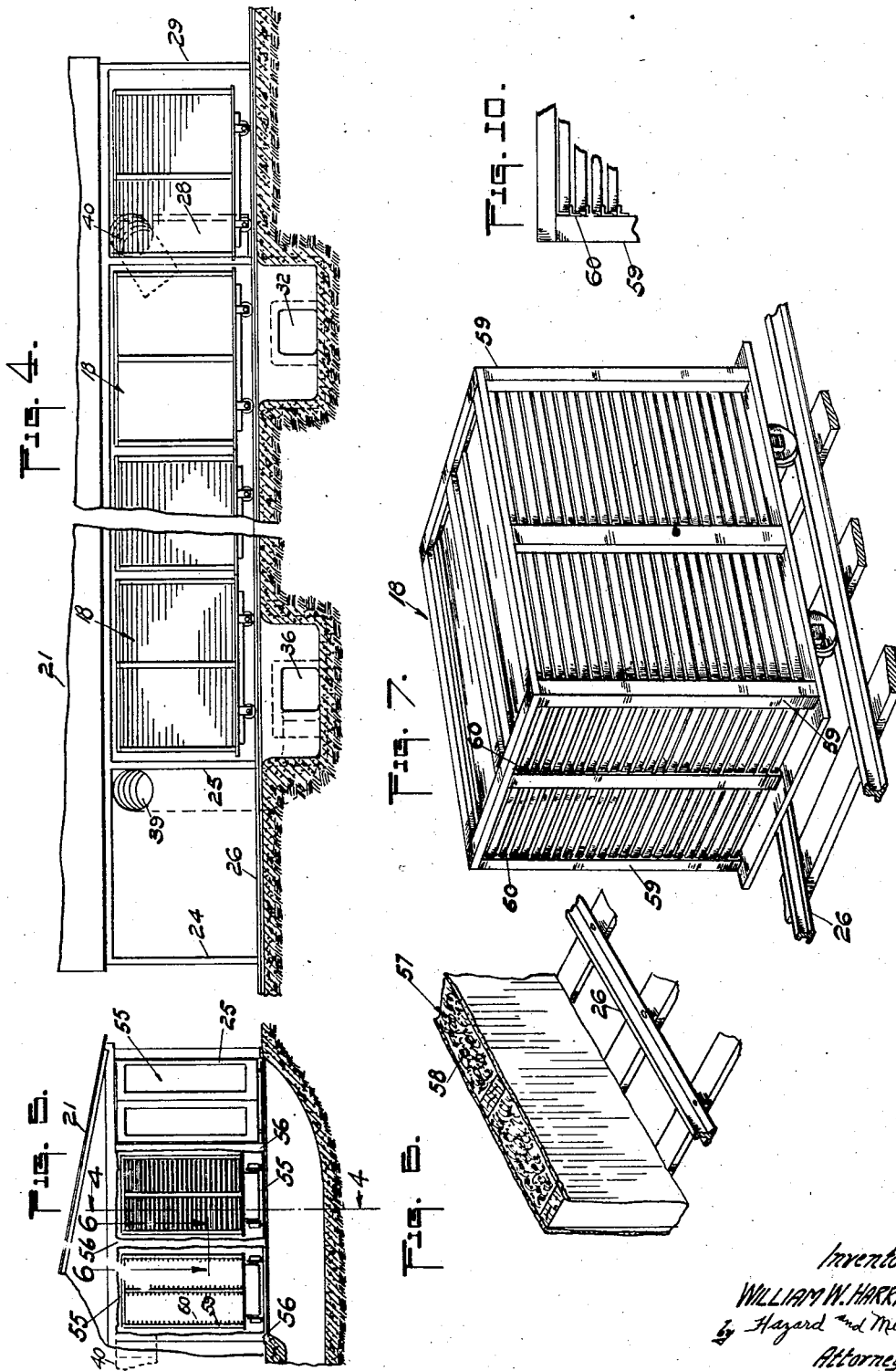

Patented Oct. 28, 1930

1,779,810

UNITED STATES PATENT OFFICE

WILLIAM W. HARRITT, OF MAYWOOD, CALIFORNIA, ASSIGNOR OF ONE-HALF TO LEAVITT L. KEENE, OF PASADENA, CALIFORNIA

METHOD AND PLANT FOR DRYING SEWAGE SLUDGE

Application filed November 14, 1927. Serial No. 233,153.

My invention comprises a method of drying sewage sludge and like products and the plant and apparatus utilized therefor.

In sewage treatment plants such as the activated sewer sludge plants, it has been very difficult to dry the sludge after passing through the filter or filter presses to prepare the product in condition for marketing. The sludge even after leaving the filter and filter presses contains a very large percentage of moisture which, to make a commercial dry product saleable as a fertilizer, must be dried to such an extent that the percentage of moisture is relatively small. This in the past has been a difficult and expensive procedure.

An object of my invention, therefore, is in a method of drying and handling the sludge after it leaves the presses or after it leaves the final stage in the handling of activated sewage sludge, by drying the sludge while it moves forward through a tunnel type of drier.

More specifically, an object of my invention consists in introducing the wet sludge into the entrance end of the tunnel between a pair of doors, and after passing through the double doors the sludge is advanced through the tunnel and is subjected to hot air which travels through the tunnel in a counter direction to the movement of the sludge. In this process there are a variety of methods which may be adopted, for instance, the sludge may be loaded on the trays and these trays carried by trucks, the individual trucks traveling through the drier, passing first into a charging chamber closed by an outside door and separated by an inside door from the drier proper, and the trucks having their exit also through an exit chamber with a door between the chamber and the drier proper and also a door at the exit of such latter chamber.

Another procedure is to carry the sludge on an endless conveyor which passes through a tunnel, the material on the conveyor being subjected to hot air which moves in the reverse direction to the movement of the sludge. This also preferably has closures at the charging end of the double door type.

A further object of my invention is to create a suction in both the charging and discharging chambers by exhausting the air therefrom so that in opening and closing the entrance and discharge doors, the odor from the air of the tunnel cannot pass out to the atmosphere. The air after drying the sludge, as well as the air exhausted in the charging and discharging chambers, may be gotten rid of in any suitable manner, as by blowing into a stack.

Another object of my invention is in the method and the appliances for conveying the dried product into bins by air blowing, in which, if desired, the air may be heated and operate to extract additional moisture from the already dried sludge.

My invention also pertains to the apparatus used in connection with the different methods or systems of drying sludge, and comprises various features of construction, as will be noted hereunder.

My invention will be more readily understood from the following description and drawings, in which:

Figure 1 is a diagrammatic side elevation of part of the plant used for handling and particularly for drying the sludge, showing the arrangement for handling the sludge with trucks.

Fig. 2 is a partial vertical section illustrating a further step in handling the dry product by utilizing air blowers for conveying this into bins and utilizing crushing and loading apparatus.

Fig. 3 is a vertical longitudinal section in diagram of an alternate type of drier using endless conveyors.

Fig. 4 is an enlarged vertical longitudinal section of part of the tunnel type of drier indicating the circulation of the air.

Fig. 5 is a vertical section through the tunnel.

Fig. 6 is a detail horizonatal section taken on the line 6—6 of Fig. 5 in the direction of the arrows showing the track and wall insulation.

Fig. 7 is a perspective view of a suitable type of truck for carrying the sludge in trays.

Fig. 8 is a longitudinal section of an endless conveyor type of drier on the line 8—8 of Fig. 9 in the direction of the arrows.

Fig. 9 is a vertical section on the line 9—9 in the direction of the arrows.

Fig. 10 is a detail of a corner of the trucks, showing the manner of supporting the trays.

Fig. 11 is a detail and side elevation showing the manner of loading the endless type of conveyors when arranged at different elevations and side by side.

Referring first to the construction of Figs. 1, 2, 4, 5, 6 and 7, a typical drier is indicated by the numeral 11 which may be of a vacuum filter or filter press type. This is indicated as having an input 12, a cylinder 13, air suction 14, and an air pressure pipe 15. The wet sludge is picked up on the cylinder 13, dried by suction and discharged from the cylinder by a blast of air under pressure. The sludge from the presser is passed through a chute 16 to a hopper 17 and from such hopper drops to the trucks 18 and is received on trays, the lowermost trays being filled first and then the other trays are placed in the truck until the full load is completed.

The drier, indicated generally by the numeral 21, is indicated as of a tunnel type, having a main drying chamber 22 and a charging chamber 23 at one end, this having outer doors 24 and inner doors 25. There is a system of tracks 26 in the tunnel on which the trucks are shifted, the trucks passing out through the discharge chamber 27 which has inner doors 28 and outer doors 29.

In the details illustrated, particularly in Figs. 4 and 5, I show the tunnel as having a plurality of longitudinal passages. These may be any desired number to handle the amount of material to be dried, and depending on the amount of room available. In some cases it may be more advisable to have a long tunnel with only one line of tracks through it, rather than to have a plurality of shorter passages in the tunnel with the trucks passing through each passage.

The drying equipment includes a furnace indicated at 30 in the diagram, this furnace being shown on the far side of the tunnel. Air ducts 31 convey the air from the furnace to an inlet blower pit 32 which is adjacent the discharge end of the drier but inside of the door 28. The direction of the motion of the trucks through the drier is indicated by the arrow 33 and the direction of the motion of the air is in a reverse direction, as indicated by the arrow 34. There are employed suitable blowers 35 for blowing the air from the furnace to the blower pit, this preferably giving a positive pressure in the tunnel. Adjacent the inlet end of the tunnel but inside of the inner door 25 there is an exhaust air pit 36 which is connected by means of a blower 37 to a discharge stack 38.

In order to prevent the air in the charging and discharging chambers from passing out to the atmosphere on the opening of the outer doors 24 and 29, I provide a ventilator 39 in the charging chamber, and another ventilator 40 in the discharging chamber; these ventilators either connect to the blower 37 or to the exhaust pit 36 so that the air is exhausted into the stack or other means of getting rid of the moisture-laden air and prevents the air carrying the disagreeable odor escaping from the charging and discharging ends of the drier.

The trucks are preferably passed through the drier by the trucks at the charging end being utilized to press the other trucks through the tunnel; or if desired the tunnel may be loaded with trucks and these left in a sufficient period of time until the product is dried to the extent desired.

As illustrated in Fig. 2 the trucks preferably after leaving the tunnel are passed over an endless conveyor 41 where the trays are emptied. This conveyor dumps into crushers 42 which discharge into a chute 43, this leading into an air blast pipe 44 through which air is blown from a blower 45. The dried and crushed material is thus, by air, deposited in the bins 46, from which it may be drawn by a loading chute 52 to a bagging machine 53. In this connection the air from the pump 45 is preferably drawn through a pipe 54 which may be connected directly to the furnaces if there is a sufficient supply of heat to the tunnels or it may draw air from the charging or discharging chambers of the tunnel, or if desired, the air may be drawn from the atmosphere. This additional step of blowing the dried product into the bins by hot air extracts an additional amount of moisture therefrom.

In the detail drawings of Figs. 4, 5, 6 and 7, as above mentioned, the tunnel is shown as having a plurality of passages 55 separated by partitions 56. These partitions are preferably double walled, as indicated at 57, with heat insulating material 58 therebetween. The racks and the trucks are preferably made by having a series of posts 59 with angle irons 60 to support the trays. These trays may be slid into the trucks from the ends or the sides.

The manner of operation of the plant so far described is substantially as follows: After the material is removed from the press or the final stage in the ordinary treatment of sewage sludge, this sludge is loaded onto the different trays and the trays stacked on the trucks. The outer door of the charging chamber available is opened and the truck is forced inward, the truck already in the charging chamber being first moved forward into the drying part of the tunnel and a truck removed from the discharging end of the tunnel. When the trucks are placed in the charging chambers or removed from the discharging chambers it is to be understood that the inner doors 25 and 28, respectively, will be maintained closed, and when these inner doors are open, if passing trucks from the charging chamber into the body of the drier or removing from the body of the drier to the discharging chamber, the outer doors 24 and 29, respectively, will be closed.

The air circulation as above set forth utilizes the hot air from the furnace, this first entering the tunnel adjacent the outlet end so that the partly dried material is subjected to the hotter temperature, and as the air passes towards the incharging end, the air gradually becomes cool and takes up moisture by passing over the trays which have a relatively large exposed surface of the sludge. The air is then exhausted into the exhaust pit and may be blown out through a stack or otherwise disposed of. There is also the ventilation system drawing through the ventilators 39 and 40 from the charging and discharging chambers. This may also be drawn into the discharge pit or directly into the stack or other means of disposing of the air. Such arrangement prevents disagreeable odors from passing out through the doors 24 and 29 when these are opened to admit trucks or for the exit of the trucks carrying dried material.

In the discharge of the trucks, the trays, as above mentioned, are dumped onto the endless conveyor 41, the material ground in the crusher 42, and blown by the air blast 43 into the bins 46 and from thence passes to the bagging machines. This additional air blast functions to take additional residual moisture from the dried and crushed material.

In the construction illustrated in Figs. 3, 8 and 9, the vacuum filter or filter press is indicated by the numeral 65, the material being fed thereto by a pump 66 and an appliance having a suction pipe 67 and pressure pipe 68. In this installation the material is dropped directly on the endless conveyor 69, the upper run 70 of which is indicated as traveling in the direction of the arrow 71. This passes into the drying tunnel 72 and there are a pair of flap doors 73 and 74 at the entrance to prevent the direct draft of the heating air blowing out in the atmosphere. This tunnel is shown with an air supply 75 from the furnace and with an exhaust 76, the inlet being adjacent the discharge end 77 of the endless conveyor and the exhaust being adjacent the charging end of the tunnel. The exhaust 76 draws the air from between the flaps 73 and 74, as indicated at 78, as well as from the entrance end of the tunnel, as indicated at 79. The material after drying drops from the endless conveyor into a chute or spout 80 and then onto a conveyor 81, the upper run of which is illustrated as traveling in the direction of the arrow 82. From this conveyor the material is dumped into a crusher 42 of the same character as shown in Fig. 2, thence passes through the chute 43 into the air pipe 44 and is deposited into the bins 46, the treatment being substantially the same as shown in Fig. 2.

In Figs. 8, 9 and 11, I have shown an arrangement for the endless conveyor type of drier in which a plurality of conveyors are arranged at different elevations and two or more conveyors arranged parallel to each elevation. In such construction the tunnels may be shorter if desired or this arrangement may be adopted to handle a large amount of material, and it is preferable that the lower conveyors extend further towards the loading end than the upper conveyors so that these may be loaded from the same loading chute.

In this construction the bottom row of conveyors is designated generally by the numeral 85 and the upper rows by the numerals 86 and 87, these being the belt type of endless conveyors; and it will be noted that the lower conveyor 85 extends beyond the conveyor 86 so that material may fall through the drop chute 88 thereon. There is a second drop chute 89 which leads to the conveyor 86 and a chute 90 to the conveyor 87, all these chutes being loaded from a trough 91 which may load directly from one or more filter presses.

In such arrangement the partitions 92 and the floors 93 may be continuous without openings, thereby forming a tunnel for each conveyor; or these may have openings between to allow freer and fuller circulation of air. In this arrangement it is desirable that the hot air enter at the discharge end of the conveyors and be drawn off adjacent the entrance end, and for each set of conveyors flaps are utilized to prevent the drying air of the tunnel from blowing out in the atmosphere.

From the above description, together with the drawings, it will be seen that I have developed a comprehensive method of handling and drying the damp sludge from sewage disposal plants and drying this into a suitable condition for storing in bins and packaging when desired. In this procedure the material may be passed through the drying tunnel in stages, that is, a truck load at a time of the sludge may be passed into a heating tunnel, and as other trucks are entered, this is pushed along until it is finally discharged. Or if desired a complete passage in a tunnel may be filled with a train of cars and these left in a specified time for sufficient drying; or if desired, the endless type of conveyor may be used, with the material continuously advancing from the cooler to the hotter end of the drying tunnel.

Various changes may be made in the principles of my invention without departing

I claim:

1. The method of drying sewage sludge comprising partly extracting the water from the sludge, depositing the partly dried sludge on a conveyor, moving such conveyor into a charging chamber, from the charging chamber through a tunnel drier, and from the tunnel drier into a discharging chamber, introducing hot air into the tunnel adjacent the discharging chamber and moving such air in a forward direction reverse to that of the conveyor and discharging such air adjacent the charging chamber, drawing air from the charging and discharging chambers to prevent such air having free outlet to the atmosphere on the opening and closing of the charging and discharging chambers.

2. The method of drying sewage sludge, as claimed in claim 1, the hot air being forced into the tunnel under pressure, and sucking the air from the tunnel adjacent the charging chamber, said suction being sufficient to prevent outward leak of air from the tunnel.

3. The method of drying sewage sludge comprising extracting the bulk of the water from such sludge and depositing the sludge on a conveyor, moving the conveyor through a tunnel drier, passing hot air through the tunnel drier in a reverse direction to that of the conveyor, discharging material from the conveyor, powdering the material and blowing such material into storage bins by dry air such blowing air absorbing residual moisture.

4. The method of drying sewage sludge comprising extracting the bulk of the water from the sludge, depositing the sludge on a conveyor, passing the conveyor into an entrance chamber then through a drying tunnel to a discharging chamber, passing hot air through the tunnel in a reverse direction to the movement of the sludge, withdrawing air from the charging and discharging chambers to prevent free outlet to the atmosphere, discharging the sludge from the conveyor, passing the dried sludge through a crusher and blowing the crushed sludge by air into storage bins.

5. In the art described, means to extract the bulk of water from sewage sludge, means to deposit the sludge on a conveyor, a tunnel drier, said conveyor being moved through the drier, means to pass air through the drier in a reverse direction to that of the movement of the conveyor, means to crush the dried material, and a blower and air passage for blowing the crushed and dried material into storage bins.

6. In the art described, the combination of means to extract the bulk of water from sewage sludge, means to deposit the sludge on a conveyor, a tunnel drier, an entrance chamber for such drier having means to prevent outlet of air to the atmosphere on the passing inwardly of sewage sludge and to cut off the outlet with the atmosphere on passing of the sludge from such chamber to the drier, means to pass hot air through the drier in a reverse direction to the movement of the conveyor, and means to exhaust air from the said charging chamber.

7. In the art described, as claimed in claim 6, a discharging chamber having means to prevent tunnel air from passing to the atmosphere, a crusher, and means to blow the crushed material into storage bins.

8. The method of drying sewage sludge comprising extracting water from the sludge by a filter press, depositing the partly dried sludge on a conveyor, moving such conveyor through a tunnel drier, forcing hot air into such tunnel drier at a position adjacent the discharge end of the tunnel, drawing air forwardly in the tunnel in a reverse direction to the movement of the sludge by suction, creating suction adjacent the charging and discharging ends of the tunnel and uniting such air with the air drawn by suction to the forward end of the tunnel thereby preventing the tunnel air from passing outwardly through the charging and discharging ends of the tunnel.

In testimony whereof I have signed my name to this specification.

WM. W. HARRITT.